United States Patent
Choo et al.

(10) Patent No.: US 6,836,300 B2
(45) Date of Patent: Dec. 28, 2004

(54) DATA WIRE OF SUB-PIXEL MATRIX ARRAY DISPLAY DEVICE

(75) Inventors: Kyo Seop Choo, Kyoungsangbuk-do (KR); June Ho Park, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/180,984

(22) Filed: Jun. 27, 2002

(65) Prior Publication Data

US 2003/0071943 A1 Apr. 17, 2003

(30) Foreign Application Priority Data

Oct. 12, 2001 (KR) ..................................... P2001-62994

(51) Int. Cl.[7] .............................................. G02F 1/136
(52) U.S. Cl. .................... 349/43; 349/106; 349/108; 349/152
(58) Field of Search ............................ 349/132, 151, 349/152, 43, 54, 55, 106, 108, 109, 139

(56) References Cited

U.S. PATENT DOCUMENTS 5,907,379 A * 5/1999 Kim et al. ................. 349/141
6,340,998 B1 * 1/2002 Kim et al. .................... 349/48
6,469,756 B1 * 10/2002 Booth, Jr. .................... 349/73

OTHER PUBLICATIONS

Elliot, Candice Hellen Brown. Active Matrix Display Layout Optimization, Aug. 22, 2000, http://www.pentile.com/IDMC2000.pdf.*

* cited by examiner

Primary Examiner—Tarifur R. Chowdhury
Assistant Examiner—Richard H Kim
(74) Attorney, Agent, or Firm—Morgan Lewis & Bockius LLP (57) ABSTRACT

A data wire device for interconnecting a pentile matrix display device includes a first blue sub-pixel data line disposed on a first substrate transmitting a first blue sub-pixel data signal, and a second blue sub-pixel data line disposed on the first substrate transmitting the first blue sub-pixel data signal, wherein the first and second blue data lines are interconnected between two blue sub-pixel regions of a display device and one blue sub-pixel data pad for receiving the first blue sub-pixel data signal from a driving circuit.

19 Claims, 12 Drawing Sheets

DATA WIRE OF SUB-PIXEL MATRIX ARRAY DISPLAY DEVICE

The present invention claims the benefit of Korean Patent Application No. P2001-62994 filed in Korea on Oct. 12, 2001, which is hereby incorporated by reference.

BACKGROUND OF THE INVENTION

1. Field of the Invention

This invention relates to data wire device of a display device, and more particularly, to a data wire device for supplying data to the pentile matrix display device.

2. Description of the Related Art

In general, a liquid crystal display (LCD) device controls a transmittance due to change arrangement of liquid crystal layer using an electric field to display image data (a picture). The LCD device includes a liquid crystal panel where liquid crystal cells are arranged in a matrix configuration, and a driving circuit for driving the liquid crystal panel.

Figure 1:
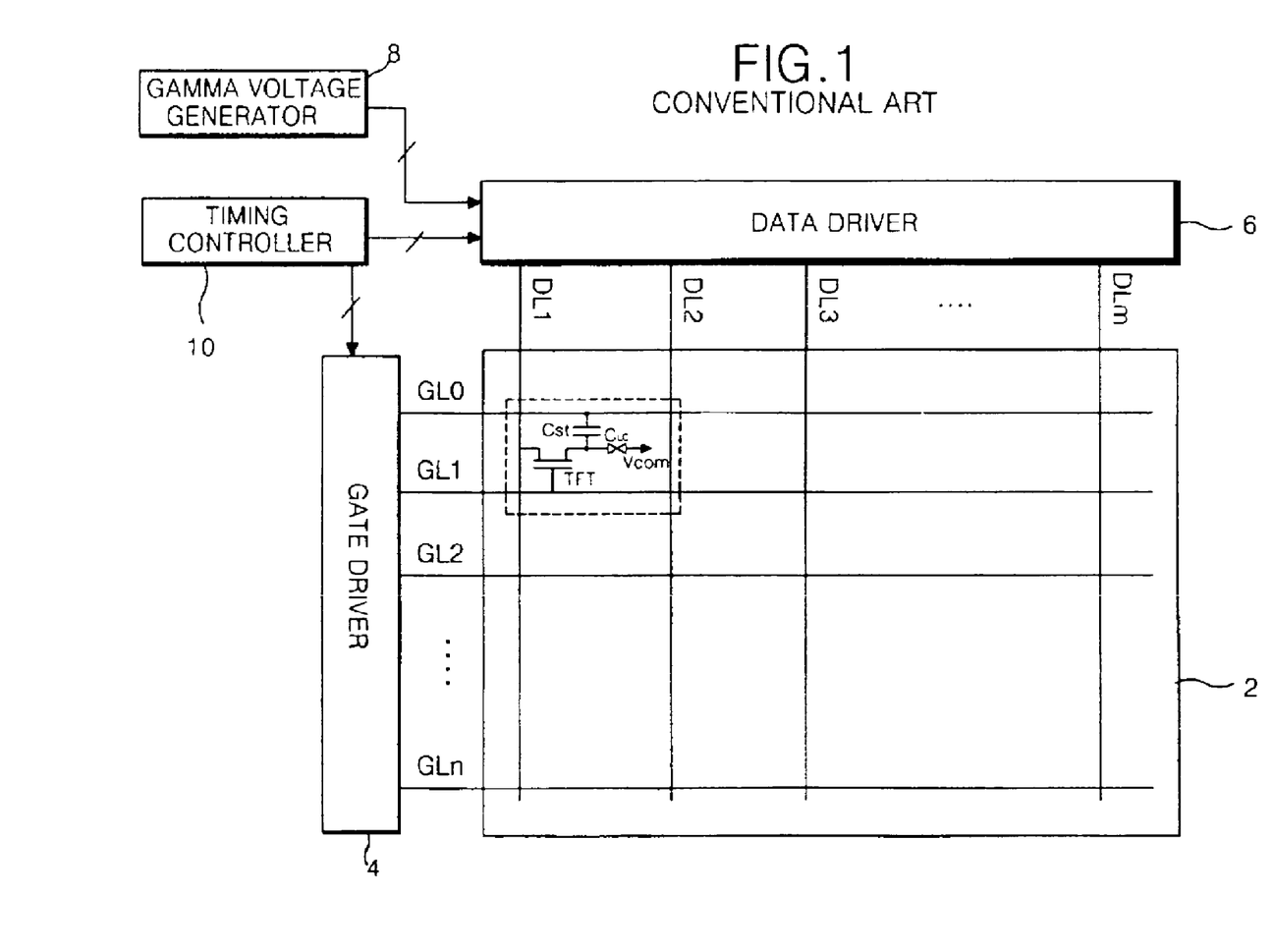
FIG. 1 is a block diagram of a liquid crystal display device according to the conventional art.

FIG. 1 is a block diagram of an LCD device according to the conventional art. In FIG. 1, the LCD device includes a liquid crystal panel 2 with liquid crystal cells arranged in a matrix configuration, a gate driver 4 for driving gate lines GL0 to GLn of the liquid crystal panel 2, a data driver 6 for driving data lines DL1 to DLm of the liquid crystal panel 2, a gamma voltage generator 8 for supplying gamma voltage to the data driver 6, and a timing controller 10 for controlling the gate driver 4 and the data driver 6.

The timing controller 10 responds to clock signals and horizontal and vertical synchronous signals received from other circuitry to control driving timing of the gate driver 4 and the data driver 6. Specifically, the timing controller 10 responds to the clock signals and the horizontal and vertical synchronous signals, and generates gate shift clock signals GSC and gate start pulses GSP to control the driving timing of the gate driver 4. In addition, the timing controller 10 responds to input clock signals and the horizontal and vertical synchronous signals, and generates data clock signals, data control signals, and polarity control signals to control the driving timing of the data driver 6. At the same time, the timing controller 10 is synchronized with the data clock signals and supplies video input data of red, green, and blue color to the data driver 6.

The gate driver 4 supplies a gate high voltage to the gate lines GL1 to GLn corresponding to a scanning period 1H to drive thin film transistors TFTs of the liquid crystal panel 2, and supplies a gate low voltage during a rest period. In addition, the gate driver 4 supplies a gate low voltage to a top gate line GL0 that forms an electrode of a storage capacitor of a first scanning line. The data driver 6 converts a digital data signal received from the timing controller 10 to an analogue data signal, and supplies data signals of 1 horizontal line portion to the data lines DL1 to DLm every one horizontal period 1H when the gate high voltage is supplied to the gate lines GL1 to GLn.

The gamma voltage generator 8 supplies a gamma voltage to the data driver 6, wherein the gamma voltage is predetermined to have different levels from one another in accordance with the voltage level of the data signal. The conversion by the data driver 6 of the digital data signal to the analogue data signal makes use of the gamma voltage to compensate gamma characteristics in the LCD device. In addition, the data driver 6 reverses polarity of the data signals supplied to the data lines DL1 to DLm in accordance with the polarity control signal received from the timing controller 10. Accordingly, when the liquid crystal panel 2 is driven by a Dot Inversion Method, the data driver 6 supplies data signals having a polarity contrary to the data signals that are supplied to adjacent liquid crystal cells in vertical and horizontal directions to each of liquid crystal cells. In addition, the data driver 6 reverses the polarity of the data signals supplied to all the liquid crystal cells on the liquid crystal panel during each frame.

The liquid crystal panel 2 includes liquid crystal cells arranged in a matrix configuration, thin film transistors TFTs formed at intersections of the gate lines GL0 to GLn and the data lines DL1 to DLm. Each of the thin film transistors TFTs respond to the gate high voltage transmitted along the gate lines GL1 to GLn, and supplies data signals transmitted along the data lines DL1 to DLm to the liquid crystal cells. Each of the liquid crystal cells can equivalently be displayed as a liquid crystal capacity capacitor CLC including a pixel electrode connected to the TFT and a common electrode facing each other with a liquid crystal material disposed therebetween. In additional, a storage capacitor Cst is provided for sustaining the data voltage charged at the liquid crystal capacity capacitor CLC in the liquid crystal cell until the next data voltage is charged, i.e., while the gate low voltage is applied. The storage capacitor Cst is formed between the previous gate line and the pixel electrode.

Figure 2:
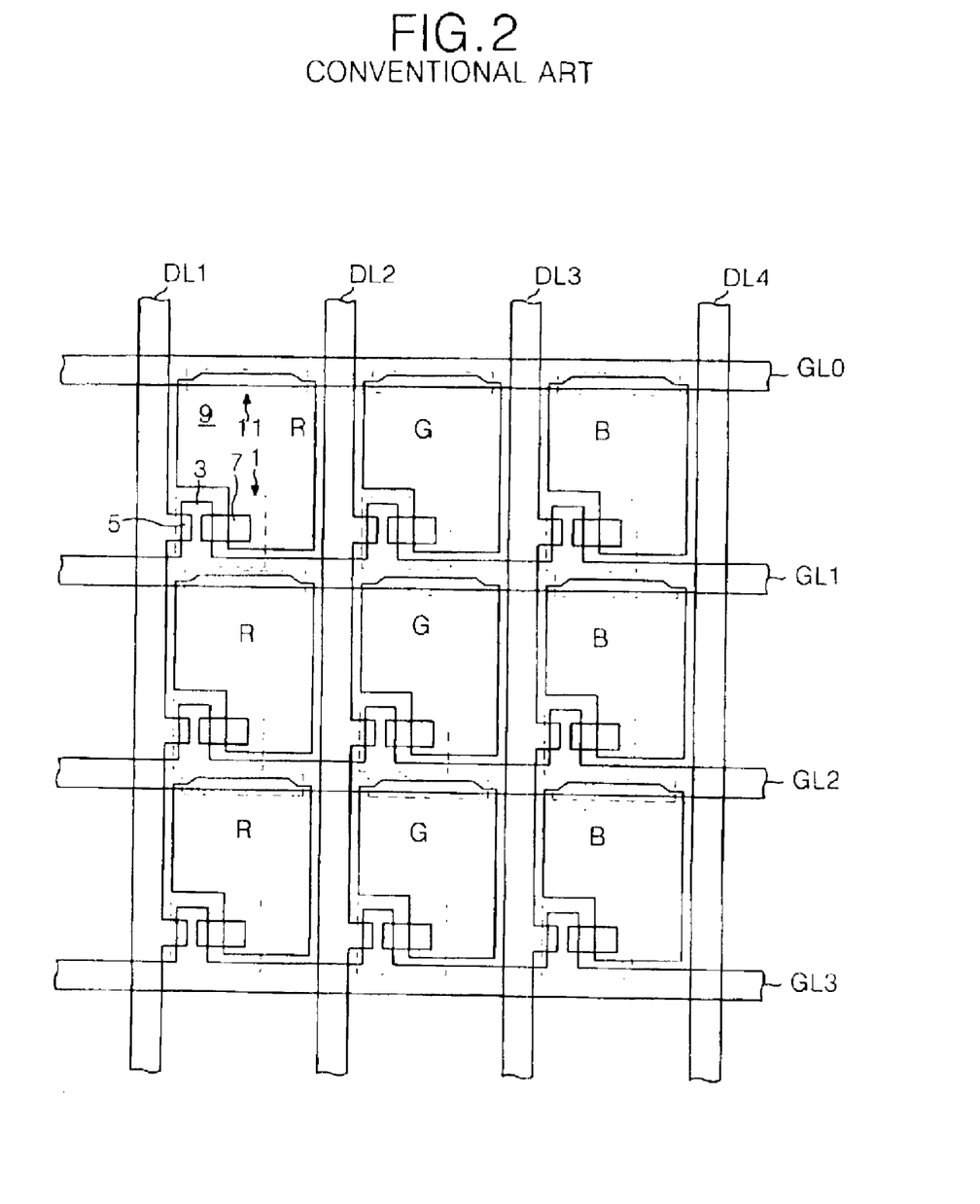
FIG. 2 is a plan view of liquid crystal cells of the liquid crystal panel shown in FIG. 1 according to the conventional art.

FIG. 2 is plane view of a liquid crystal cell of the liquid crystal panel shown in FIG. 1 according to the conventional art. In FIG. 2, a pixel electrode is provided within each cell area provided at intersections of the gate lines GL1 to GL3 and the data lines DL1 to DL4. The pixel electrode 9 is connected to a corresponding one of the data lines DL1 to DL4 via source and drain electrodes 5 and 7 of the TFT 1, and a gate electrode 3 of the TFT 1 is connected to one of the gate lines GL1 to GL3. A storage capacitor 11 is formed within an overlapping area of the corresponding pixel electrode 9 and a previous one of the gate lines GL(i−1). Data signals corresponding to one of red R, green G, and blue B color filters for color display are supplied to each of the data lines DL1 to DL4. Each of the red, green, and blue color filters are formed on an upper substrate corresponding to the cell area where the pixel electrode 9 is formed, and a common electrode is formed upon the color filters for supplying a reference voltage to an underlying liquid crystal material layer. Each pixel of the liquid crystal cells may be expressed by a combination of red R, green G, and blue B sub-pixels arranged in parallel. A plurality of contact pads (not shown) are provided along an edge area of the liquid crystal panel to electrically contact output terminals of the gate driver and the data driver, which are manufactured as IC chips through a Tape Carrier Package. Each of the plurality of contact pads are formed to correspond in a one-to-one relationship with the gate lines and the data lines on the liquid crystal panel.

Figure 3:
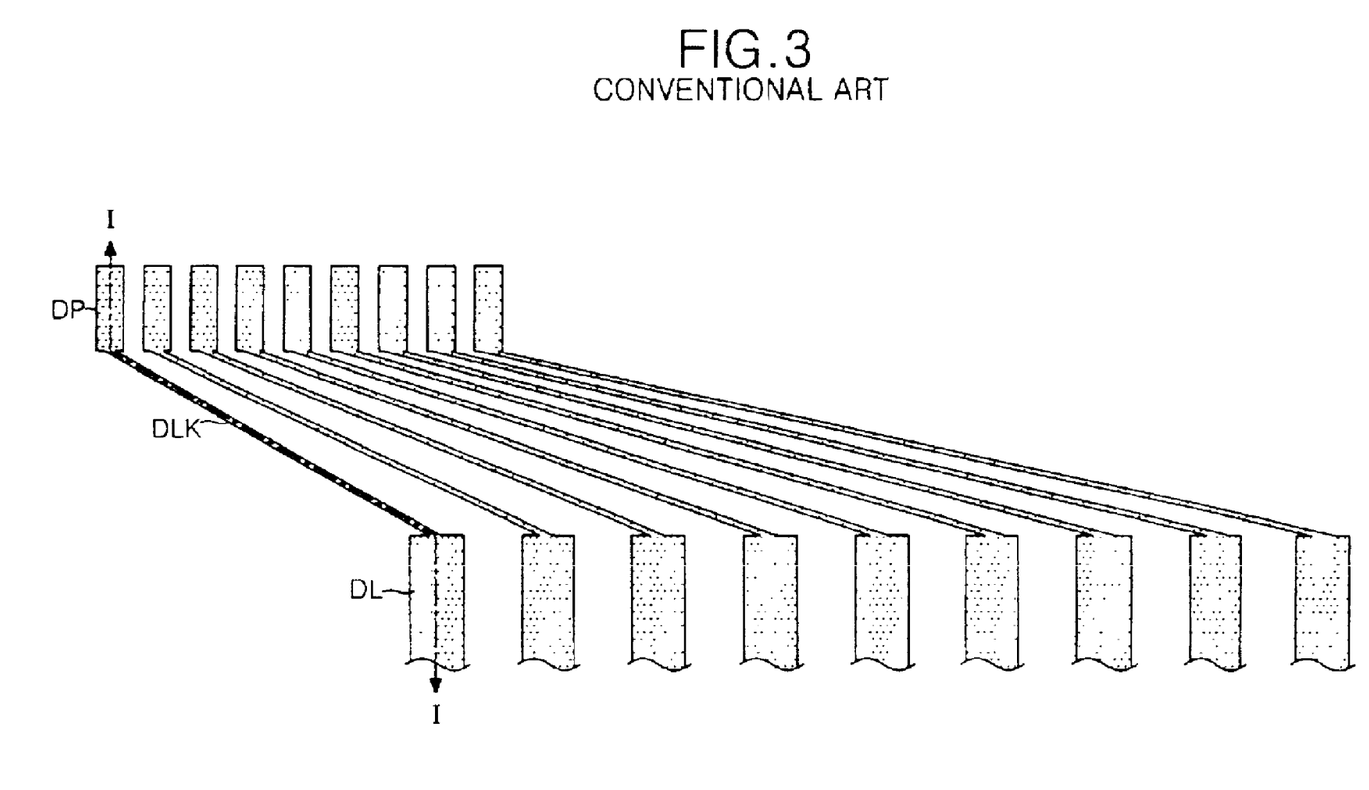
FIG. 3 is a plan view of data pads connected to the data lines shown in FIG. 2 according to the conventional art.

FIG. 3 is a plane view of data pads connected to the data lines shown in FIG. 2 according to the conventional art. In FIG. 3, data pads DP are connected to data lines DL through data links DLK. The data pads DP, which are connected to the tape carrier package with the data drive IC chip, are disposed with relatively narrow gaps for contacting with output pads of the tape carrier package. Conversely, the data lines DL that are formed within a picture display area are disposed with relatively wide gaps. Accordingly, the data pads DP, the data lines DL, and the data links DLK are formed as a body.

Figure 4:
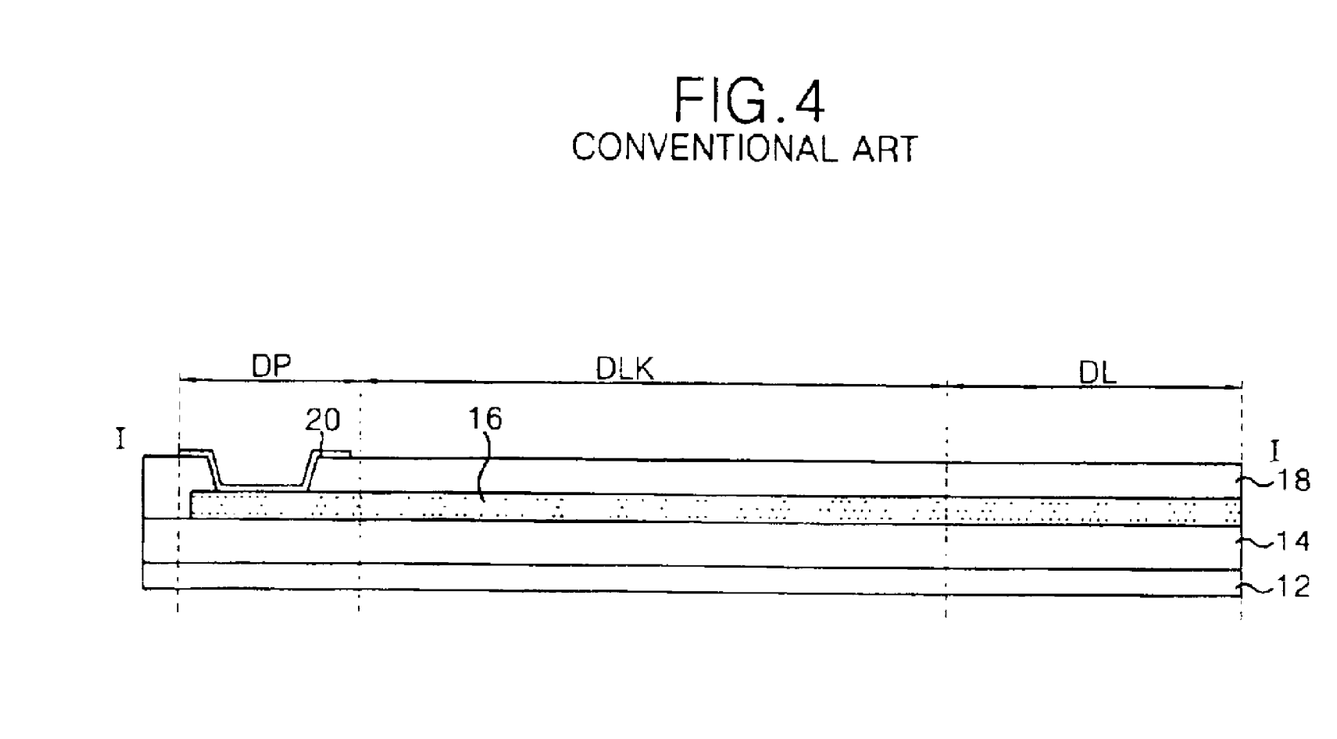
FIG. 4 is a cross-sectional view of the data pad shown in FIG. 3 along I—I according to the conventional art.

FIG. 4 is a cross-sectional view of the data pad shown in FIG. 3 along I—I according to the conventional art. In FIG. 4, a source/drain electrode layer 16 is formed on a gate insulating film 14 of a lower substrate 12. The lower substrate 12 includes a data pad DP portion, a data link DLK portion, and a data line DL portion. A protective film 18 is formed on the source/drain electrode layer 16, and is patterned to form a contact hole within an area where the data pad DP portion is located. In addition, a pad terminal electrode 20 made of a transparent electrode material is formed together with the pixel electrode of the picture display area, and electrically contacts the data pad DP portion of the source/drain electrode layer 16.

However, the LCD device according to the conventional art is problematic. With the advent of higher resolution display devices, a total number of pixels increases for displaying a clear picture. Accordingly, the increase in the total number of pixels results in a corresponding increase of the number of drive IC's required to drive the pixels, thereby increasing costs. In addition, a total number of red, green, and blue sub-pixels increases, wherein the sub-pixels are disposed in a stripe shape and limit realization of high resolution in conventional LCD devices.

SUMMARY OF THE INVENTION

Accordingly, the present invention is directed to a data wire device of a pentile matrix panel that substantially obviates one or more of the problems due to limitations and disadvantages of the related art.

An object of the present invention to provide a data wire device of a display panel device having a high resolution.

Another object of the present invention is to provide a data wire device suitable for a display panel device having a high resolution.

Additional features and advantages of the invention will be set forth in the description which follows, and in part will be apparent from the description, or may learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data wire device for interconnecting a pentile matrix display device includes a first blue sub-pixel data line disposed on a first substrate transmitting a first blue sub-pixel data signal, and a second blue sub-pixel data line disposed on the first substrate transmitting the first blue sub-pixel data signal, wherein the first and second blue data lines are interconnected between two blue sub-pixel regions of a display device and one blue sub-pixel data pad for receiving the first blue sub-pixel data signal from a driving circuit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
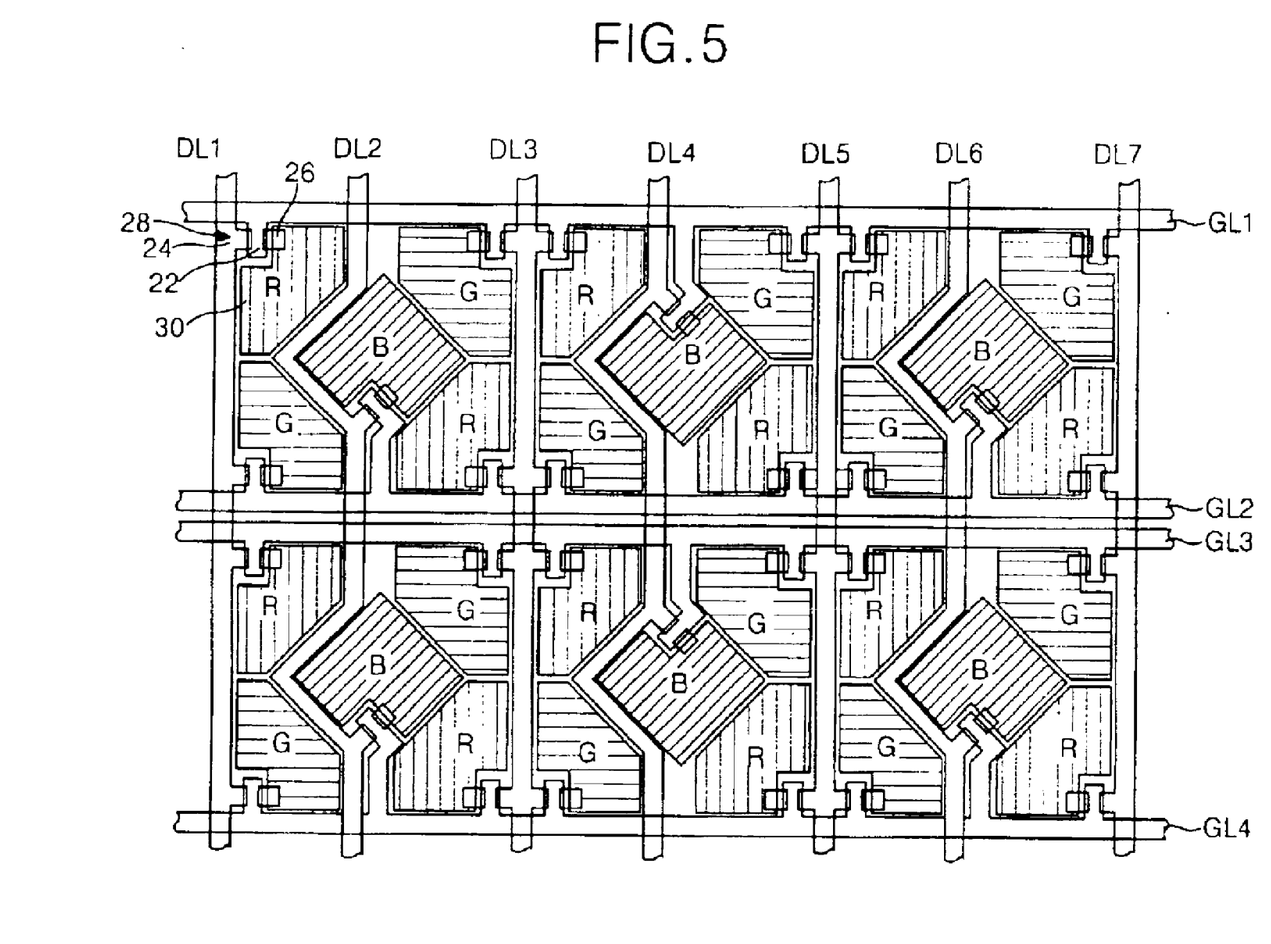
FIG. 5 is a plan view of an exemplary sub-pixel matrix array display device according to the present invention.

FIG. 5 is a plane view of an exemplary sub-pixel matrix array display device according to the present invention. In FIG. 5, the exemplary sub-pixel matrix array display device may include a plurality of pixel cells, a plurality of thin film transistors TFTs, a plurality of gate lines GL1 to GLn, and a plurality of data lines DL1 to DLn. Each of the pixel cells may include two red sub-pixels R located diagonally along a first direction, a blue sub-pixel B located within a central portion of the pixel cell, and two green sub-pixels G located diagonally along a second direction perpendicular to the first direction around the blue sub-pixel B. In addition, each of the pixel cells may include a plurality of TFTs located at intersections of the gate lines GL1 to GL4 and the data lines DL1 to DL7, to function as switching devices to electrically interconnect the gate lines GL1 to GL4 and the data lines DL1 to DL7 corresponding to red, blue, and green sub-pixels R, B, and G.

For example, a TFT 28 is located at an intersection of a gate line GL1 and a data line DL1 and includes a gate electrode 22 electrically connected to the gate line GL1, a source electrode 24 electrically connected to the data line DL1, and a drain electrode 26 electrically connected to pixel electrode 30 that corresponds to a red sub-pixel R. Accordingly, the TFT 28 functions as a switching device to electrically connect a signal transmitted on the data line DL1 to the pixel electrode 30 via the gate, source, and drain electrodes 22, 24, and 26.

Each of the red, green, and blue sub-pixels R, G, and B may be located on a first substrate (not shown) and a second substrate may be provide facing the first substrate having sub-color filters formed to correspond to the sub-pixels R, G, and B. Accordingly, a liquid crystal layer may be provided between the first and second substrates. In addition, a common electrode may be provided to cover an entire interior surface of the first substrate(color filter substrate) for supplying a reference voltage to the liquid crystal material layer. Accordingly, each of sub-pixels R, G, and B may be driven in accordance with a data voltage supplied to the pixel electrode 30, thereby emitting light of a specific color to display a picture.

In FIG. 5, the five sub-pixels R, G, and B included in one pixel may be driven by two gate lines. For example, first adjacent red and green sub-pixels R and G along a gate line direction may be driven when a gate high voltage is provided to a first gate line GL1, and second adjacent red and green sub-pixels R and G along the gate line direction may be driven when a gate high voltage is provided to a second gate line GL2. Likewise, a blue sub-pixel B may be driven when a gate high voltage is provided to the second gate line GL2. According, each sub-pixel R, G, and B may be driven by the first and second gate lines GL1 and GL2.

In FIG. 5, the sub-pixels R, G, and B included in the one pixel may receive data signals through three data lines. For example, first adjacent red and green sub-pixels R and G along a data line direction may be electrically connected to a first data line DL1, and second red and green sub-pixels R and G along the data line direction may be electrically connected to a third data line DL3. Likewise, a blue sub-pixel B may be electrically connected to a second data line DL2.

Accordingly, the first and the third data lines DL1 and DL3 may alternately supply a red data signal and a green data signal every one horizontal period 1H, and since the blue sub-pixel B is only connected to the second data line DL2, the second data line DL2 may supply a blue data signal. In addition, two adjacent blue sub-pixels B along the date line direction share the data lines in order to reduce a total number of data drive IC's for driving the data lines. Moreover, in order to supplying data by a Dot Inversion Method adjacent blue sub-pixels B along the gate line direction may be arranged to receive signals of opposite polarity to the sub-pixels adjacent thereto. For example, a first blue sub-pixel B that is connected to the second data line DL2 is also driven and a third blue sub-pixel B that is connected to a sixth data line DL6 are both driven by the second gate line GL2, whereas a second blue sub-pixel B that is connected to a fourth data line DL4 is driven by the first gate line GL1. Accordingly, a first driving signal received by the first and third blue sub-pixels B may have an opposite polarity to a second drive signal received by the second blue sub-pixel B since the first and third blue sub-pixels B are driven by the second gate line GL2 and the second blue sub-pixel B is driven by the first gate lines GL1.

Figure 6:
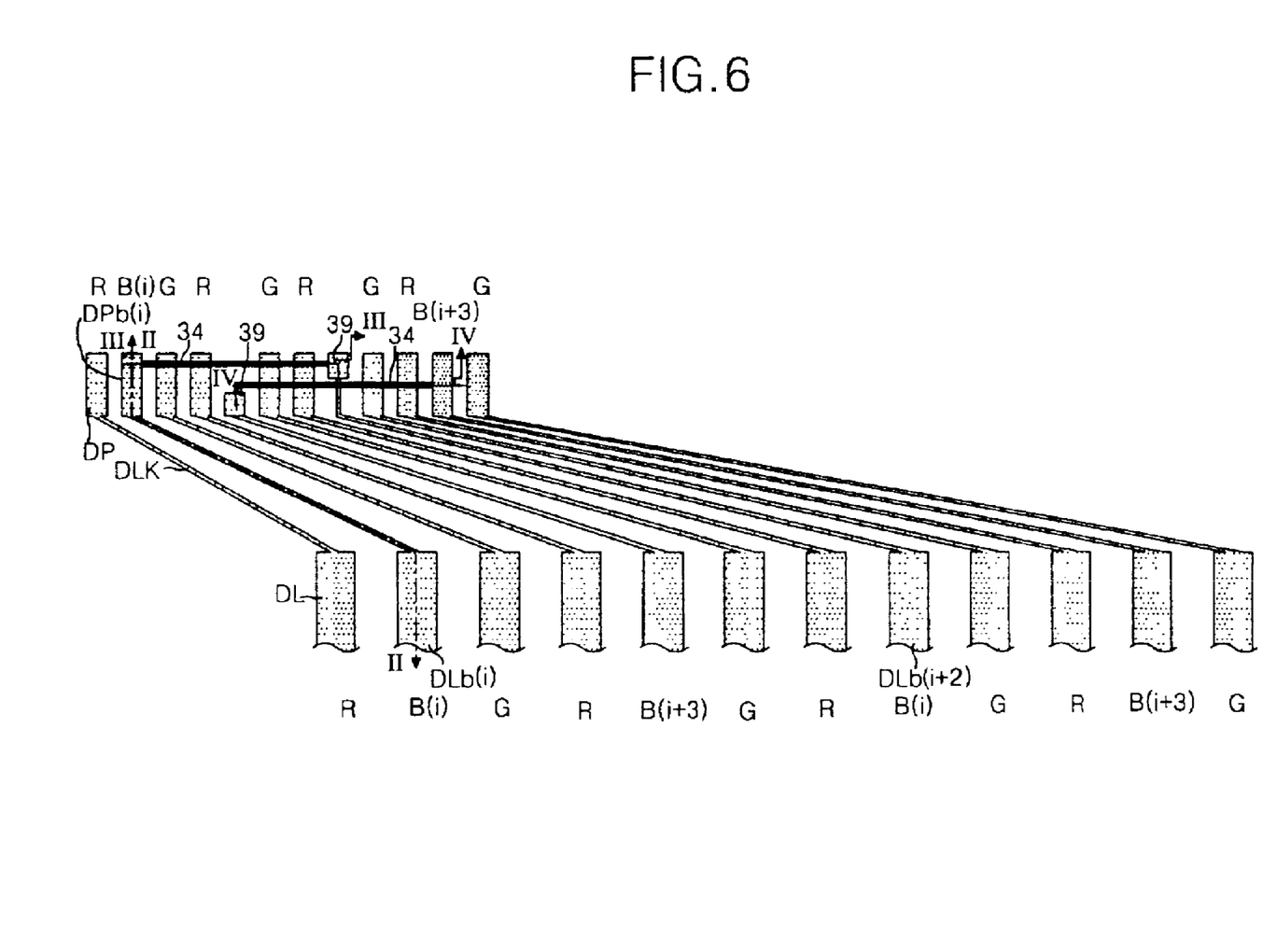
FIG. 6 is a plan view of an exemplary data wire structure of a sub-pixel matrix array display device according to the present invention.

FIG. 6 is a plane view of an exemplary data wire structure of a sub-pixel matrix array display device according to the present invention. In FIG. 6, the exemplary data wire structure may include a plurality of data pads DP connected to an external data driver (not shown), a plurality of data lines DL may be connected to the plurality of data pads DP through a corresponding plurality of data links DLK. For example, two data lines DLb(i) and DLb(i+1) that supply blue sub-pixel data signals to two separate data pads 39 may be electrically interconnected by a gate metal pattern 34. Accordingly, the two data lines DLb(i) and DLb(i+1) may receive the same blue sub-pixel data signal through the gate metal pattern 34.

Figure 7:
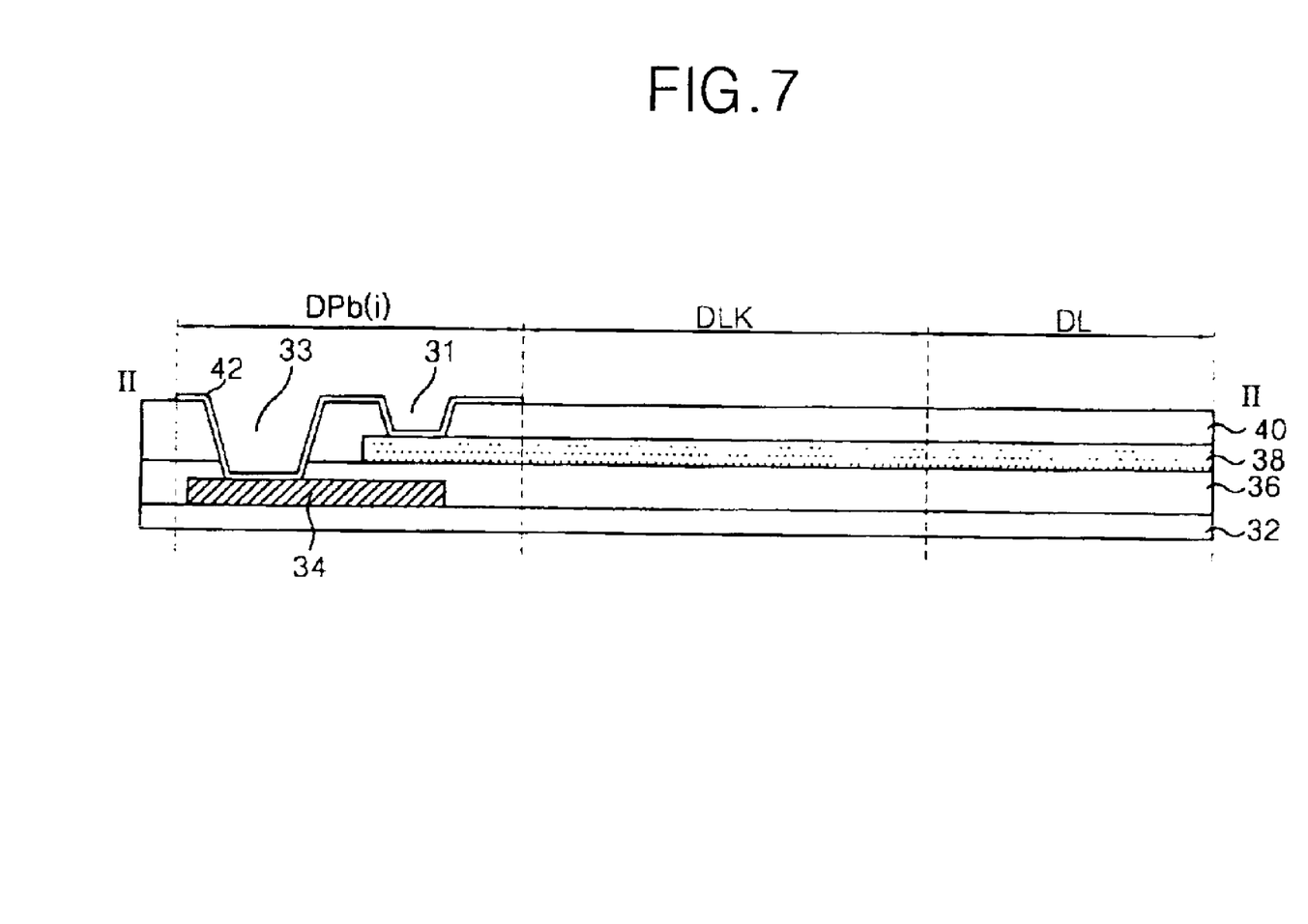
FIG. 7 is a cross-sectional view of the exemplary data wire structure shown in FIG. 6 taken along II—II according to the present invention.

FIG. 7 is a cross-sectional view of the exemplary data wire structure shown in FIG. 6 taken along II—II according to the present invention. In FIG. 7, a gate metal pattern 34 may be formed on a lower substrate 32 along a direction to traverse each of the data pads DP (in FIG. 6), and a gate insulating film 36 may be formed on the gate metal pattern 34. A source/drain electrode layer 38 may be formed on the gate insulating film 36 such that one end portion may function as one of the data pads DP (in FIG. 6).

A protective film 40 may be formed on the source/drain electrode layer 38, and patterned to form first contact holes 31 along an area of the data pads DP. In addition, second contact holes 33 may be formed in the protective film 40 and the gate insulating film 36 within a contact area where the gate metal pattern 34 is to electrically contact the source/drain electrode layer 38. A pad terminal electrode 42 may be formed of a transparent electrode material to electrically interconnect the gate metal pattern 34 through the second contact holes 33 and an end portion of the source/drain electrode layer 38 through the first contact hole 31.

Figure 8:
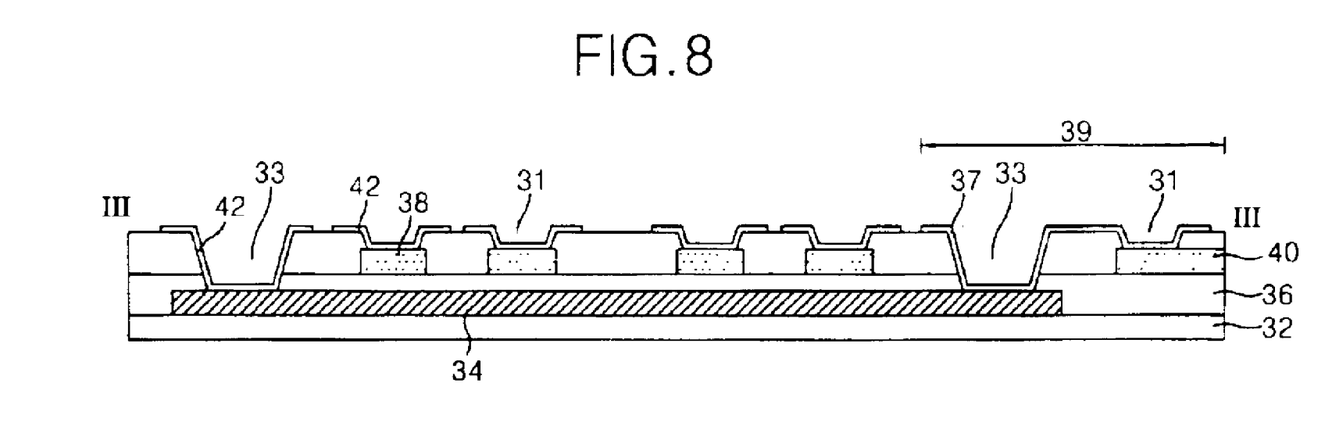
FIG. 8 is a cross-sectional view of the exemplary data wire structure shown in FIG. 6 taken along III—III according to the present invention.
Figure 9:
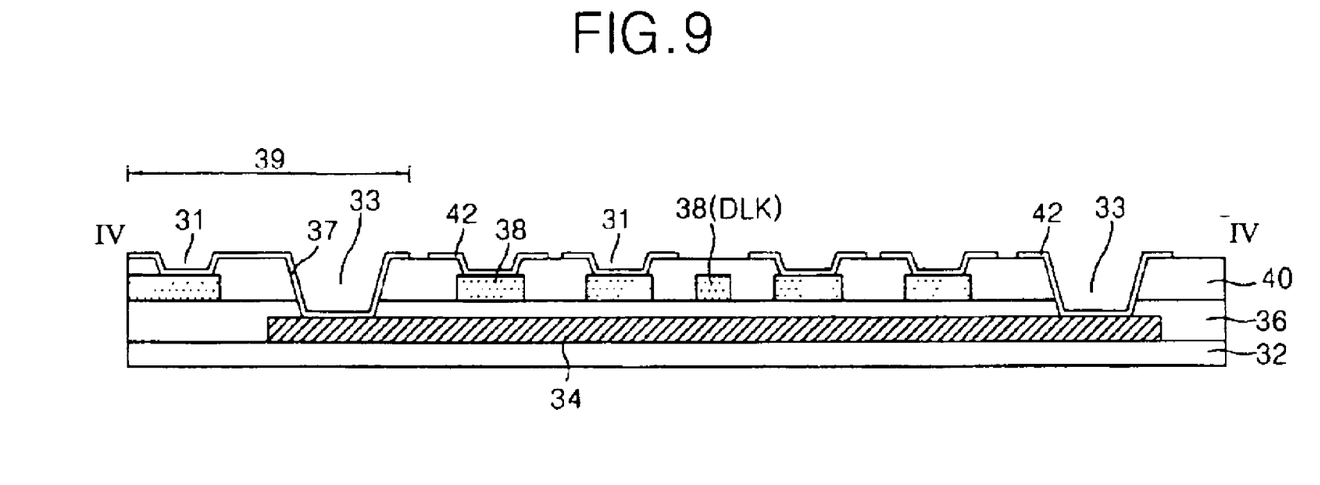
FIG. 9 is a cross-sectional view of the exemplary data wire structure shown in FIG. 6 taken along IV—IV according to the present invention.

FIG. 8 is a cross-sectional view of the exemplary data wire structure shown in FIG. 6 taken along III—III according to the present invention, and FIG. 9 is a cross-sectional view of the exemplary data wire structure shown in FIG. 6 taken along IV—IV according to the present invention. In FIGS. 8 and 9, the pad terminal electrode 42 may be electrically connected to the blue sub-pixel data pad DPb(i) portion where the gate metal pattern 34 is formed to be commonly connected to the source/drain metal layer 38 and the gate metal pattern 34 through the second contact hole 33. A contact electrode 37 may be formed at the terminal electrode 42 and the contact portion 39 where the data pad DP is not formed. The contact electrode 37 may be connected to the gate metal pattern 34 through the second contact hole 33, and may be connected to the data link DLK of the source/drain electrode layer 38 through the first contact hole 31. Accordingly, one blue sub-pixel data pad DPb(i) may be commonly connected to two blue sub-pixel data lines DLb(i) and DLb(i+1), and may supply one blue sub-pixel data signal B(i) that is produced by the data driver along the two blue sub-pixel data lines DLb(i) and DLb(i+1).

Figure 10:
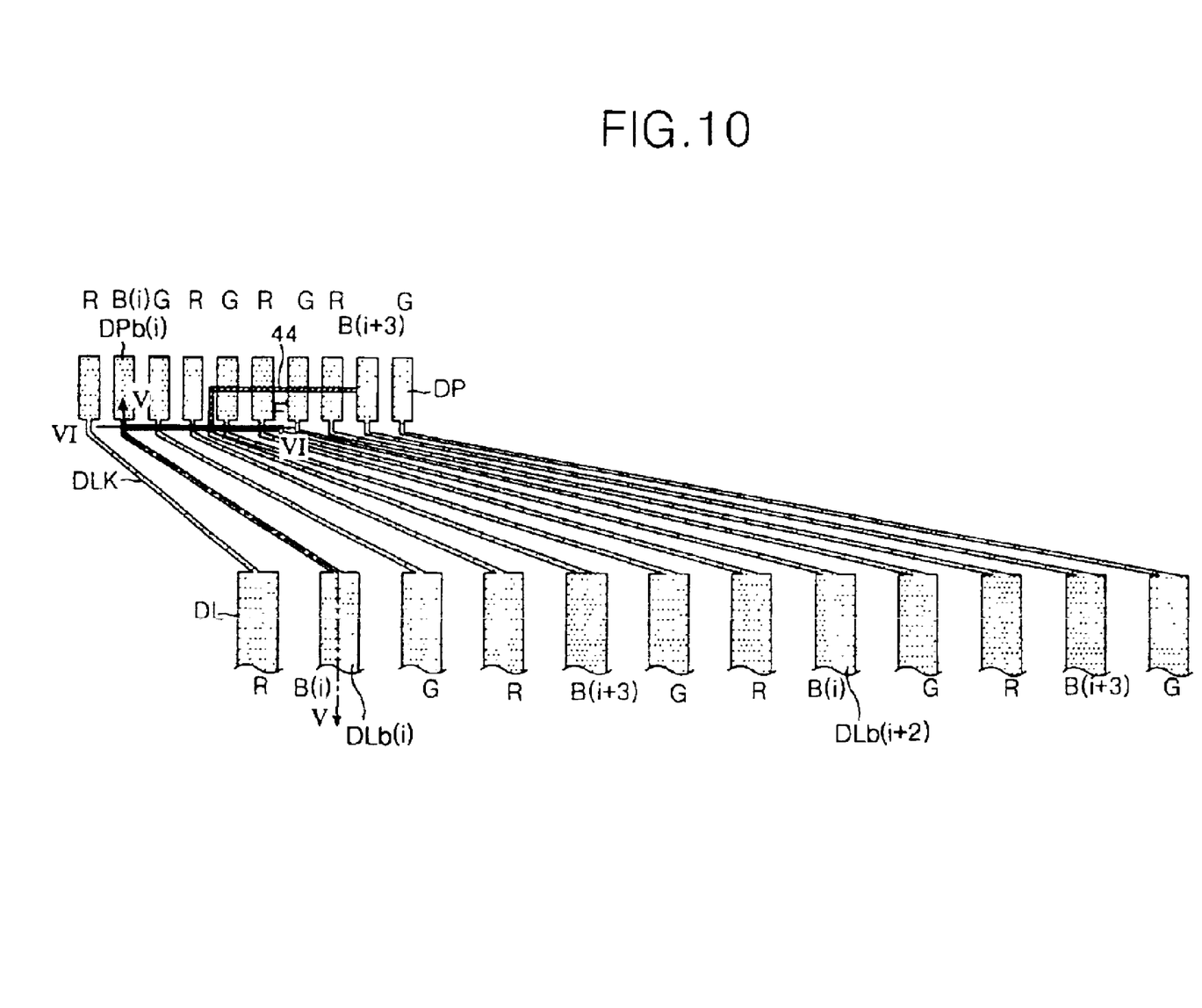
FIG. 10 is a plan view of another exemplary data wire structure of a sub-pixel matrix array display device according to the present invention.

FIG. 10 is a plane view of another exemplary data wire structure of a sub-pixel matrix array display device according to the present invention. In FIG. 10, a plurality of data pads DP may be equally disposed along a first direction, and two data lines that supply blue sub-pixel data signals may be connected to one of the data pads DP via a data link DLK. For example, a first data pad DPb(i) may supply an B(i) data signal that may be commonly connected to a first data line DLb(i) and a second data line DLb(i+2). Accordingly, it is unnecessary to provide a data pad DP separately supplying the B data signal from the data driver to the second data line DLb(i+2) within the pad area. As a result, a total number of data pads DP may be less than a total number of data lines DL, thereby a spacing between adjacent data pads DP may be decreased. Thus, the second data line DLb(i+2) may be connected to the first data line DLb(i) via the data link DLK and the gate metal pattern 44, and the data pads DP may be equally disposed along the first direction.

Figure 11:
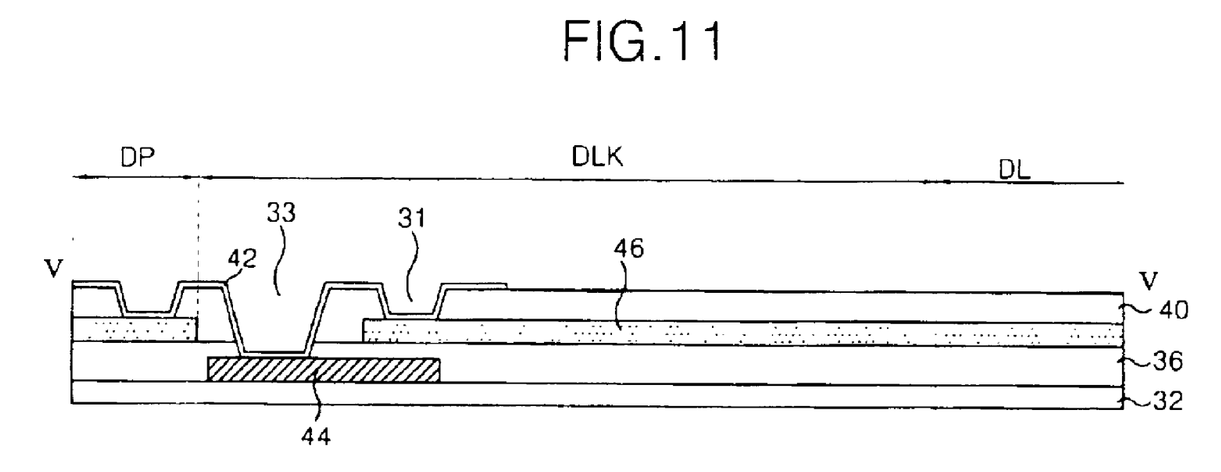
FIG. 11 is a cross-sectional view of the exemplary data wire structure shown in FIG. 10 taken along V—V according to the present invention.
Figure 12:
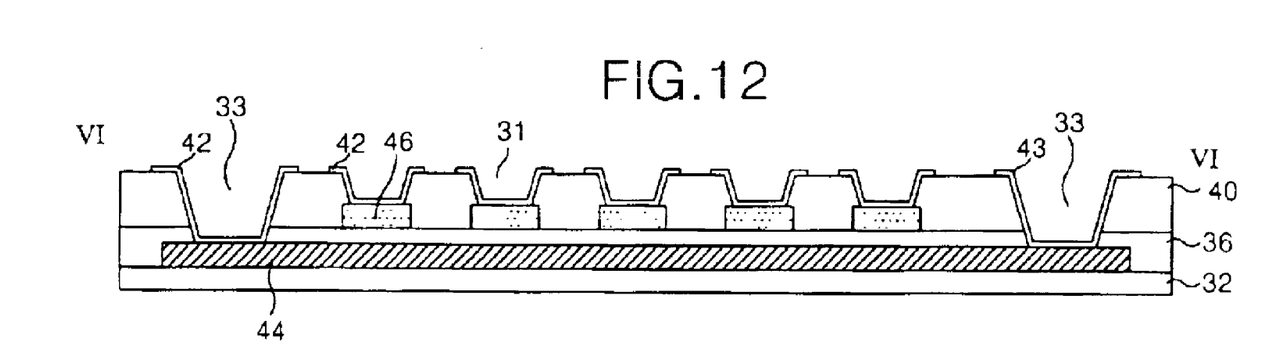
FIG. 12 is a cross-sectional view of the exemplary data wire structure shown in FIG. 10 taken along VI—VI according to the present invention.

FIG. 11 is a cross-sectional view of the exemplary data wire structure shown in FIG. 10 taken along V—V according to the present invention, and FIG. 12 is a cross-sectional view of the exemplary data wire structure shown in FIG. 10 taken along VI—VI according to the present invention. In FIG. 11, a gate metal pattern 44 may be formed on a lower substrate 32 along a first direction of the plurality of data pads DP, and a gate insulating film 36 may be formed on the lower substrate 32 and the gate metal pattern 44. A source/drain electrode layer 38 that functions as the data pad DP, the data line DL, and the data link DLK may be formed on the gate insulating film 36.

A protective film 40 may be formed and on the source/drain electrode layer 38, and patterned to form first contact holes 31 along an area of the data pads DP. In addition, second contact holes 33 may be formed in the protective film 40 and the gate insulating film 36 within a contact area where the gate metal pattern 34 is to electrically contact the source/drain electrode layer 38. A pad terminal electrode 42 may be formed of a transparent electrode material to electrically interconnect the gate metal pattern 44 through the second contact hole 33 and an end portion of the source/drain electrode layer 46 through the first contact hole 31. Accordingly, one blue sub-pixel data pad DPb(i) may be commonly connected to two blue sub-pixel data lines DLb(i) and DLb(i+1) to supply one blue sub-pixel data signal B(i) supplied from the data driver to the two blue sub-pixel data lines DLb(i) and DLb(i+1).

Figure 13:
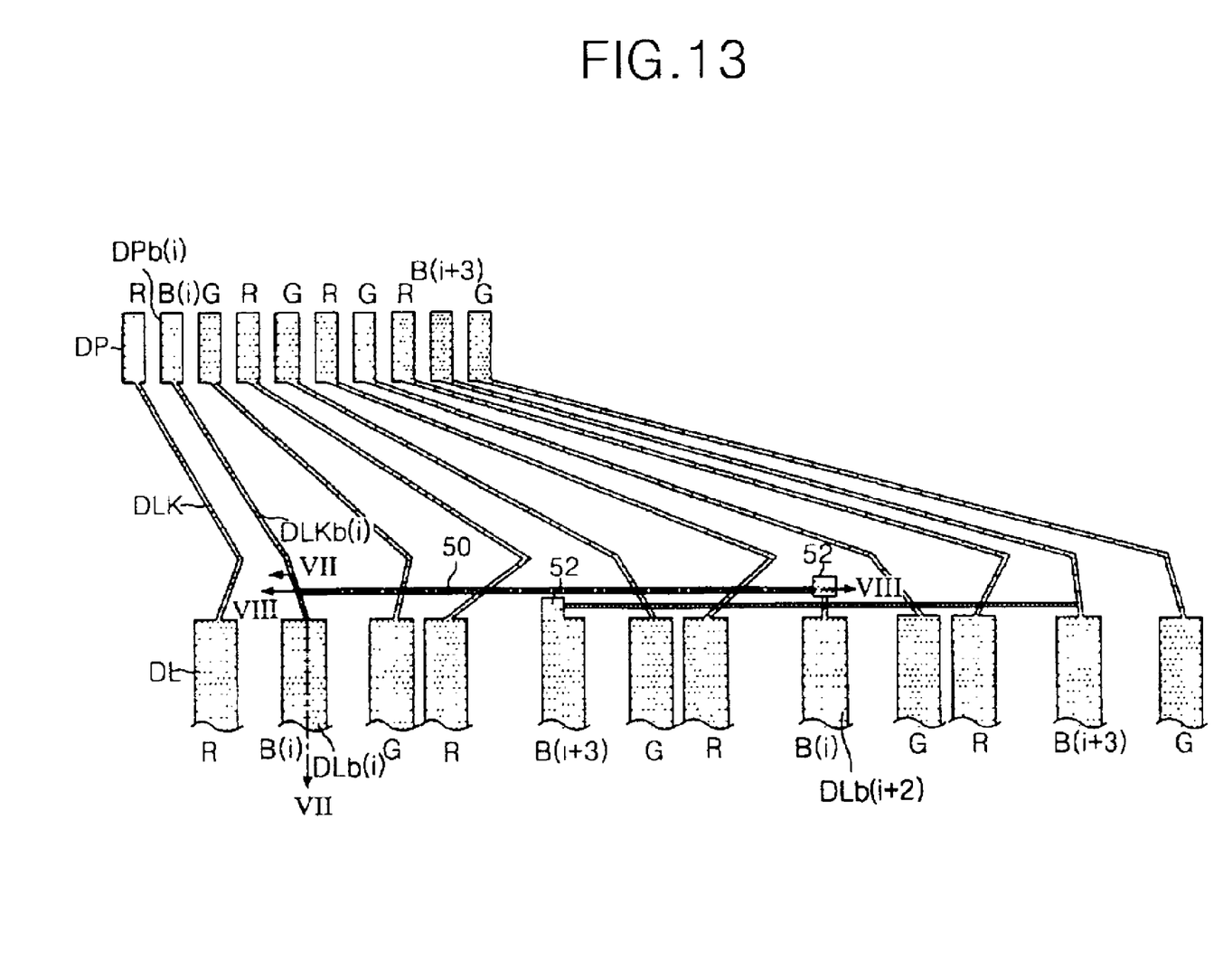
FIG. 13 is a plan view of another exemplary data pad structure of a sub-pixel matrix array display device according to the resent invention.

FIG. 13 is a plan view of another exemplary data pad structure of a sub-pixel matrix array display device according to the present invention. In FIG. 13, a plurality of data pads DP may be equally disposed along a first direction, and a first data line DLb(i) and a second data line DLb(i+2) that may supply a first blue sub-pixel data signal are connected to a first data link DLKb(i) at an area adjacent to the data lines DL. For example, the first data link DPKb(i) may supply a first data signal B(i) from a first data pad DPb(i) that may be commonly connected to the first data line DLb(i) such that the first data signal B(i) is supplied to both of the first and second data lines DLb(i) and DLb(i+2). Accordingly, it may not be necessary to separately supply the first data signal B(i) to both the first and second data lines DLb(i) and DLb(i+2). As a result, a total number of data pads DP may be less than a total number of data lines DL, thereby the data lines DL may be unequally disposed along the first direction. Thus, the second data line DLb(i+2) may be connected to the first data line DLb(i) via a contact portion 52 and a gate metal pattern 50. The contact portion 52 may be provided in a shape projected from the second data line DLb(i+2).

Figure 14:
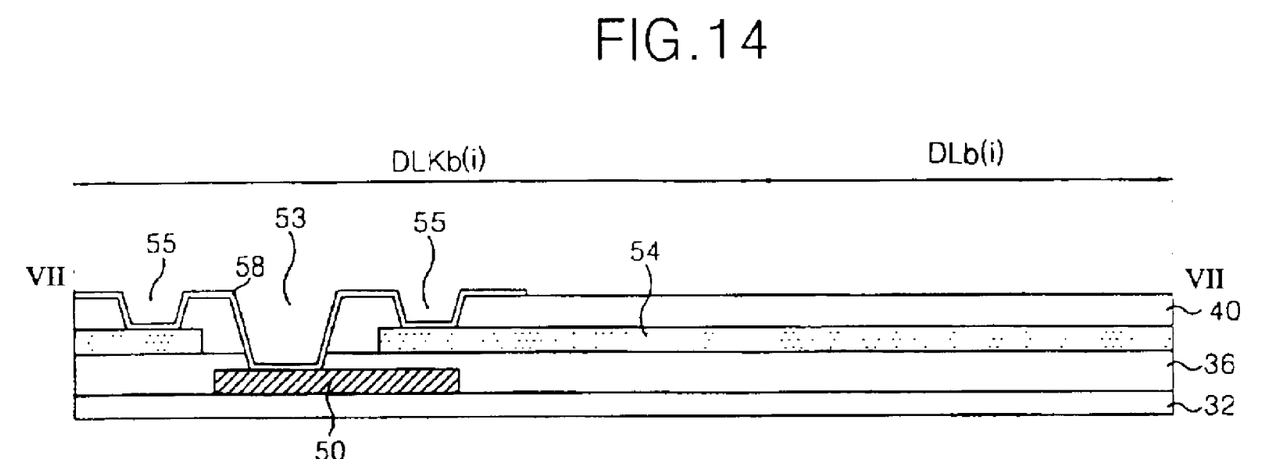
FIG. 14 is a cross-sectional view of the exemplary data wire structure shown in FIG. 13 taken along VII—VII according to the present invention.
Figure 15:
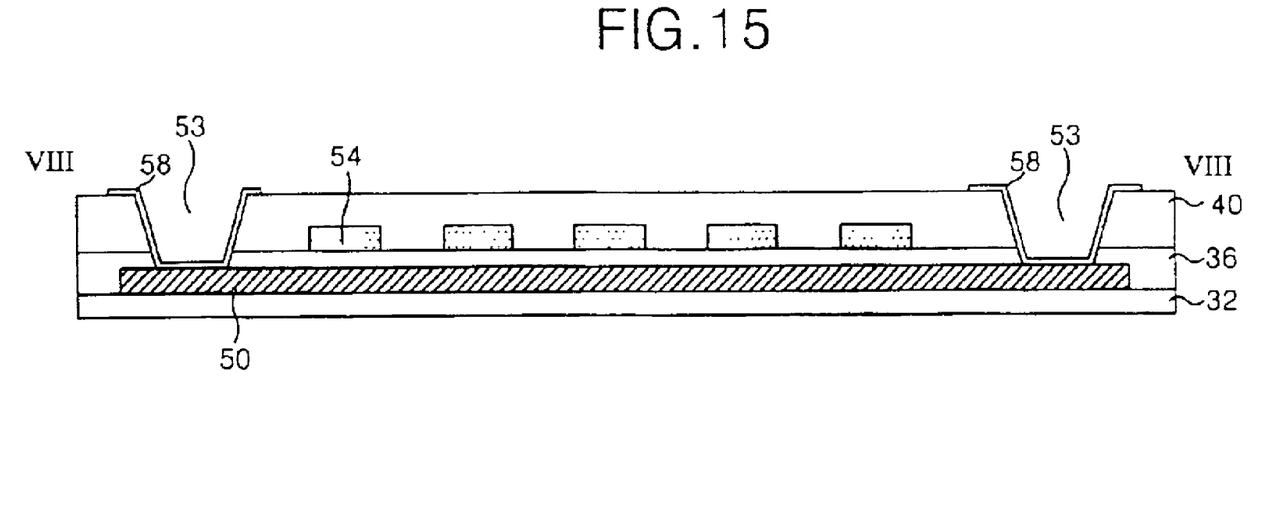
FIG. 15 is a cross-sectional view of the exemplary data wire structure shown in FIG. 13 taken along VIII—VIII according to the present invention.

FIG. 14 is a cross-sectional view of the exemplary data wire structure shown in FIG. 13 taken along VII—VII according to the present invention, and FIG. 15 is a cross-sectional view of the exemplary data wire structure shown in FIG. 13 taken along VIII—VIII according to the present invention. In FIGS. 14 and 15, a gate metal pattern 50 may be formed on a lower substrate 32 to electrically interconnect a first data link DLKb(i) along a direction traversing the data links DLK without any interference. A gate insulating film 36 may be formed over the lower substrate 32 and the gate metal pattern 50. A source/drain electrode layer 54 that functions as the data pad DP, the data line DL, and the data link DLK may be provided on the gate insulating film 36.

A protective film 40 may be formed on the source/drain electrode layer 54, and patterned to form first contact holes (not shown) within the data pad DP area. In addition, second contact holes 53 may be formed in the protective film 40 and the gate insulating film 36 within a contact area where the gate metal pattern 50 is to electrically contact the source/drain electrode layer 54 within a data link DLK portion and a contact portion 52. Moreover, third contact holes 55 may be formed in the protective film 40 within an area where the source/drain electrode layer 54 is located.

A pad terminal electrode (not shown) may be formed of a transparent electrode material to electrically contact a data pad DP portion of the source/drain electrode layer 38 through the first contact holes (not shown). A contact electrode 58 may be simultaneously formed at the pad terminal electrode (not shown), at the B data link DLKb, and at the contact portion 50. The contact electrode 58 may be electrically connected to the gate metal pattern 50 through the second contact holes 53, and may be electrically connected to the data line DL portion and the data link DLK of the source/drain electrode layer 54 through the third contact holes 55. Accordingly, the first data pad DPb(i) may be commonly connected to the first and second data lines DLb(i) and DLb(i+1) such that the first data signal B(i) is supplied from the data driver to the first and second data lines DLb(i) and DLb(i+1).

As described above, the data wire structure of the sub-pixel matrix array panel according to the present invention has two blue sub-pixel data wires connected within an area adjacent to a data pad area, a data link area, or data line to provide for a Dot Inversion Driving Method, wherein one blue sub-pixel data signal is supplied two blue sub-pixel data lines.

It will be apparent to those skilled in the art that various modifications and variations can be made in the pentile matrix display device and data wire structure of a sub-pixel matrix array display device of the present invention without departing from the spirit or scope of the invention. Thus, it is intended that the present invention cover the modifications and variations of this invention provided they come within the scope of the appended claims and their equivalent.

What is claimed is:

1. A data wire device for interconnecting a sub-pixel matrix array display device, comprising:
   a first blue sub-pixel data line disposed on a first substrate transmitting a first blue sub-pixel data signal; and
   a second blue sub-pixel data line disposed on the first substrate transmitting the first blue sub-pixel data signal,
   wherein the first blue sub-pixel data line is connected to one blue sub-pixel data pad and the second blue sub-pixel data line is connected to the one blue sub-pixel data pad via a connecting part.

2. The device according to claim 1, wherein the first and the second blue sub-pixel data lines are disposed between a red sub-pixel data line and a green sub-pixel data line.

3. The device according to claim 1, wherein the first blue sub-pixel data line is connected to the one blue sub-pixel data pad via a first data link, and the connecting part connects between a second data link and a point between the second data link and the one blue sub-pixel data pad.

4. The device according to claim 3, wherein the connecting part includes a gate metal pattern connected to the one blue sub-pixel data pad and disposed along a direction traversing a plurality of data pads or data links, and a contact part connecting the second data link and the gate metal pattern.

5. The device according to claim 4, wherein the gate metal pattern is connected to the one blue sub-pixel data pad through a pad terminal electrode connected to a source/drain electrode layer of the one blue sub-pixel data pad, and is connected to a source/drain electrode layer of the second data link through a contact electrode formed at the contact part.

6. The device according to claim 1, wherein the first blue sub-pixel data line is connected to the one blue sub-pixel data pad via a first data link, and the connecting part connects between the second blue sub-pixel data line and the first data link.

7. The device according to claim 6, wherein the connecting part includes a gate metal pattern disposed between the first data link and the second blue sub-pixel data line along a direction traversing a plurality of additional data links, a first contact part connecting the first data link and the gate metal pattern, and a second contact part connecting the gate metal pattern and the second blue sub-pixel data line.

8. The device according to claim 7, wherein the gate metal pattern is connected to a source/drain electrode layer of the first data link via a first contact electrode formed at the first contact part, and is connected to a source/drain electrode layer of the second blue sub-pixel data line via a second contact electrode formed at the second contact part.

9. The device according to claim 1, wherein at least one of the two blue sub-pixel regions is disposed at a central portion of a pixel cell.

10. The device according to claim 9, wherein the pixel cell includes two red sub-pixel regions located diagonally from the central portion of the pixel cell along a first direction, and two green sub-pixel regions located diagonally from the central portions of the pixel cell along a second direction.

11. The device according to claim 10, wherein the second direction is perpendicular to the first direction.

12. A data wire device, comprising:
a first substrate having a plurality of pixel cells, each of the pixel cells having one blue sub-pixel region surrounded by two red sub-pixel regions and two green sub-pixel regions;
a first blue sub-pixel data line disposed on the first substrate transmitting a first blue sub-pixel data signal; and
a second blue sub-pixel data line disposed on the first substrate transmitting the first blue sub-pixel data signal,
wherein the first blue sub-pixel data line is connected to one blue sub-pixel data pad, and the second blue sub-pixel data line is connected to the one blue sub-pixel data pad via a connecting part.

13. The device according to claim 12, wherein the first and the second blue sub-pixel data lines are disposed between a red sub-pixel data line and a green sub-pixel data line.

14. The device according to claim 12, wherein the first blue sub-pixel data line is connected to the one blue sub-pixel data pad via a first data link, and the second blue sub-pixel data line is connected to the one blue sub-pixel data pad via the connecting part connected between a second data link and a point between the second data link and the one blue sub-pixel data pad.

15. The device according to claim 14, wherein the connecting part includes a gate metal pattern connected to the one blue sub-pixel data pad and disposed along a direction traversing a plurality of data pads or data links, and a contact part connecting the second data link and the gate metal pattern.

16. The device according to claim 15, wherein the gate metal pattern is connected to the one blue sub-pixel data pad through a pad terminal electrode connected to a source/drain electrode layer of the one blue sub-pixel data pad, and is connected to a source/drain electrode layer of the second data link through a contact electrode formed at the contact part.

17. The device according to claim 12, wherein the first blue sub-pixel data line is connected to the one blue sub-pixel data pad via a first data link, and the second blue sub-pixel data line is connected to the one blue sub-pixel data pad via the connecting part connected between the second blue sub-pixel data line and the first data link.

18. The device according to claim 17, wherein the connecting part includes a gate metal pattern disposed between the first data link and the second blue sub-pixel data line along a direction traversing a plurality of additional data links, a first contact part connecting the first data link and the gate metal pattern, and a second contact part connecting the gate metal pattern and the second blue sub-pixel data line.

19. The device according to claim 18, wherein the gate metal pattern is connected to a source/drain electrode layer of the first data link via a first contact electrode formed at the first contact part, and is connected to a source/drain electrode layer of the second blue sub-pixel data line via a second contact electrode formed at the second contact part.

* * * * *